US012608379B2

(12) United States Patent
Roberts et al.

(10) Patent No.: US 12,608,379 B2
(45) Date of Patent: Apr. 21, 2026

(54) REAL-TIME IDENTIFICATION OF FACT HALLUCINATIONS IN ARTIFICIAL INTELLIGENCE (AI)

(71) Applicant: Anacode Labs Inc, Castro Valley, CA (US)

(72) Inventors: Michael Roberts, Los Gatos, CA (US); Albert Wegener, Castro Valley, CA (US)

(73) Assignee: Anacode Labs Inc, Castro Valley, CA (US)

( * ) Notice: Subject to any disclaimer, the term of this patent is extended or adjusted under 35 U.S.C. 154(b) by 0 days.

(21) Appl. No.: 19/192,180

(22) Filed: Apr. 28, 2025

(65) Prior Publication Data

US 2025/0335440 A1      Oct. 30, 2025

Related U.S. Application Data

(60) Provisional application No. 63/646,634, filed on May 13, 2024, provisional application No. 63/639,536, filed on Apr. 26, 2024.

(51) Int. Cl.
*G06F 16/00* (2019.01)
*G06F 16/2453* (2019.01)
(52) U.S. Cl.
CPC .............................. *G06F 16/24542* (2019.01)
(58) Field of Classification Search
CPC .................................................. G06F 16/24542
USPC .......................................................... 707/718
See application file for complete search history.

(56) References Cited

U.S. PATENT DOCUMENTS

| | | | | |
|---|---|---|---|---|
| 11,875,130 B1* | 1/2024 | Bosnjakovic | .......... | G06N 3/042 |
| | | | | 707/707 |
| 12,339,839 B2* | 6/2025 | Verkruyse | ......... | G06F 16/24522 |
| | | | | 707/707 |
| 2024/0119220 A1* | 4/2024 | Aggarwal | ................ | G06N 3/08 |
| | | | | 707/707 |
| 2024/0378400 A1* | 11/2024 | Zhang | .................... | G06F 40/40 |
| | | | | 707/707 |
| 2025/0086211 A1* | 3/2025 | Bolcer | ................ | G06F 16/3344 |
| | | | | 707/707 |
| 2025/0173541 A1* | 5/2025 | Dolph | .................... | G06N 3/006 |
| | | | | 707/707 |
| 2025/0252320 A1* | 8/2025 | Mayande | ................. | G06N 5/01 |
| | | | | 707/707 |
| 2025/0328781 A1* | 10/2025 | Brilliant | ................. | G06N 5/022 |
| | | | | 707/707 |

(Continued)

*Primary Examiner* — Alexandria Y Bromell
(74) *Attorney, Agent, or Firm* — Law Office of Dorian Cartwright; Dorian Cartwright

(57) ABSTRACT

An AI query response processed by an artificial intelligence (AI) module using a neural model is received as an input. The query response is compared to one or more tokenized facts of the compressed blocks at a data level. Comparing includes computing a similarity score of a vector derived from the tokenized query response to one or more vectors derived from the one or more tokenized facts. Responsive to a verification result failing to meet a similarity score threshold, it can be determined that a hallucination exists in the AI query response and a policy-based action, such as blocking the AI query response, can be taken. Responsive to the verification result meeting the similarity threshold, the AI query response can be allowed to proceed.

14 Claims, 8 Drawing Sheets

(56)                References Cited

U.S. PATENT DOCUMENTS

2025/0328818 A1 * 10/2025 Brilliant ................ G06N 20/00
                                                    707/707
2025/0328974 A1 * 10/2025 Brilliant ................ G06N 20/00
                                                    707/707

* cited by examiner

100

Figure 2:
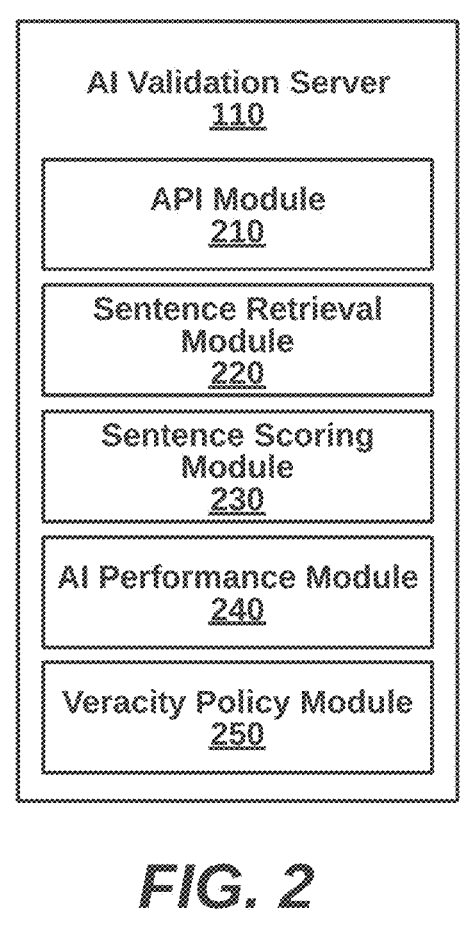

AI Validation Server
110

API Module
210

Sentence Retrieval
Module
220

Sentence Scoring
Module
230

AI Performance Module
240

Veracity Policy Module
250

START

TRAIN AI MODEL USING DATA RESOURCES
310 (SEE DETAILS IN FIGS 4A & 4B)

TOKENIZE AND INDEX FACT DATABASE
320

PROCESS AI QUERY BY AI MODULE TO
PRODUCE AI RESPONSE
330

VALIDATE AI QUERY RESPONSE
IN REAL-TIME
340 (SEE DETAILS IN FIG. 5)

END

405

Map:
KaggleTokenIDs
-> TokenDef

415

TokenDef
Type
KaggleTokenID
LocalTokenID
LocalTokenBitLen

Word
WordLen

Map:
LocalTokenIDs ->
TokenDef

410

420

Header
Defines TokenIDs; references
KaggleDictionaryIDs and words not
in that dictionary

DataSegment

List of LocalTokenIDs

425

REAL-TIME IDENTIFICATION OF FACT HALLUCINATIONS IN ARTIFICIAL INTELLIGENCE (AI)

CROSS-REFERENCE TO RELATED APPLICATIONS

This application claims the benefit of priority under 35 USC 119(e) to U.S. App 63/639,536, filed Apr. 26, 2024, by Roberts et al. and to U.S. App 63/646,634, filed May 13, 2024, by Roberts et al., the contents of each being hereby incorporated by reference in their entirety.

FELD OF THE INVENTION

The invention relates generally to computers and artificial intelligence (AI), and more specifically, for real-time identification of fact hallucinations in query results produced by AI.

BACKGROUND

Recent years have seen the development of a variety of machine learning (ML) and AI technologies based on Large Language Models (LLMs). These technologies have found a variety of applications, including natural language processing, text/voice chat, and human-robot communications.

ChatGPT is one exemplar of this strand of technology. Such systems are typically based on the transformer model of AI, which processes data by tokenizing the input and performing (largely mathematical) operations to discover inter-token relationships, thus training a model which encodes some of the properties of the input. Systems trained using such techniques typically use "attention models", which enable the transformer model to "see" different parts of the sequence of tokens, the context in which a sentence exists (whether temporal, or in a larger document), and other related properties.

Complete AI systems are often composed of multiple neural network layers, including recurrent, feedforward, embedding and attention layers. Input training data for these systems frequently uses very large databases of "plain text", which is suitable for compression in the conventional sense. Many other variants of the "transformer" model exist; the "generative AI" approach is an exemplar that enables the "creation" of content based on prompts that we particularly wish to draw attention to.

However, content or responses generated by such applications, while applicable for many uses, can contain hallucinations of facts. Hallucinations are beliefs or output sentences that are generated based on input to the model which have little, or no, grounding in the original input data. They can result from insufficient training data leading to an averaging which takes place when the model assumes certain elements which seem to be common to different items in the training database. There can also be deliberate sabotage to data.

Although the process leading up to the generation of an actual specific hallucination is complex, resolution of such issues often require ad-hoc access to small pieces of the original text, so that the veracity of the output from the ML system can be compared with actual, real, data and not generated from "aggregate" properties which are discovered from analysis of the original material, yet necessarily do not contain all of the information contained in that material. This process can occur during training, or at other times, while the system is deployed.

It is clearly not currently practical for any trained system to contain a representation of all the training data in the memory of a single computer, especially when deployed at the network edge. In any case, the process of training itself is by definition the process of establishing more distilled relationships between tokens and concepts. In such a process, some of the original information is invariably abstracted or "lost in translation."

Therefore, given that we have established that the generation of a perfect model is not possible, for the reasons above, as well as fundamental time and complexity limitations, what is needed is a robust technique for real-time identification of fact hallucinations in query results produced by AI.

SUMMARY

These shortcomings are addressed by the present disclosure of methods, computer program products, and systems for real-time identification of fact hallucinations in query results produced by AI.

In one embodiment, an AI query response processed by an AI module using a neural model is received as an input. The form factor can be servers connected over a data communication network, or alternatively, be embedded in a single AI device or appliance (e.g., a robot). The AI query response involves at least two facts. Real-time verification of the query response is performed by locating and retrieving compressed blocks from a token database having word-level similarity to the AI query response, by first tokenizing data of the AI query response.

In another embodiment, the AI query response is compared to two or more tokenized facts of the compressed blocks at a data level. Comparing includes computing a similarity score of a vector derived from the tokenized query response to one or more vectors derived from the one or more tokenized facts. Responsive to a verification result failing to meet a similarity score threshold, it can be determined that a fact hallucination exists in the AI query response and a policy-based action, such as blocking the AI query response, can be taken. Responsive to the verification result meeting the similarity threshold, the AI query response can be allowed to proceed.

Advantageously, AI query results validated using these techniques, are more accurate and reliable.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2 is a more detailed illustration of an AI verification server of the system of FIG. 1, according to an embodiment.

DETAILED DESCRIPTION

The description below provides methods, computer program products, and systems for real-time identification of fact hallucinations in query results produced by AI.

One of ordinary skill in the art will recognize many additional variations made possible by the succinct description of techniques below.

I. Systems for Identifying Fact Hallucinations (FIGS. 1-2)

Figure 1:
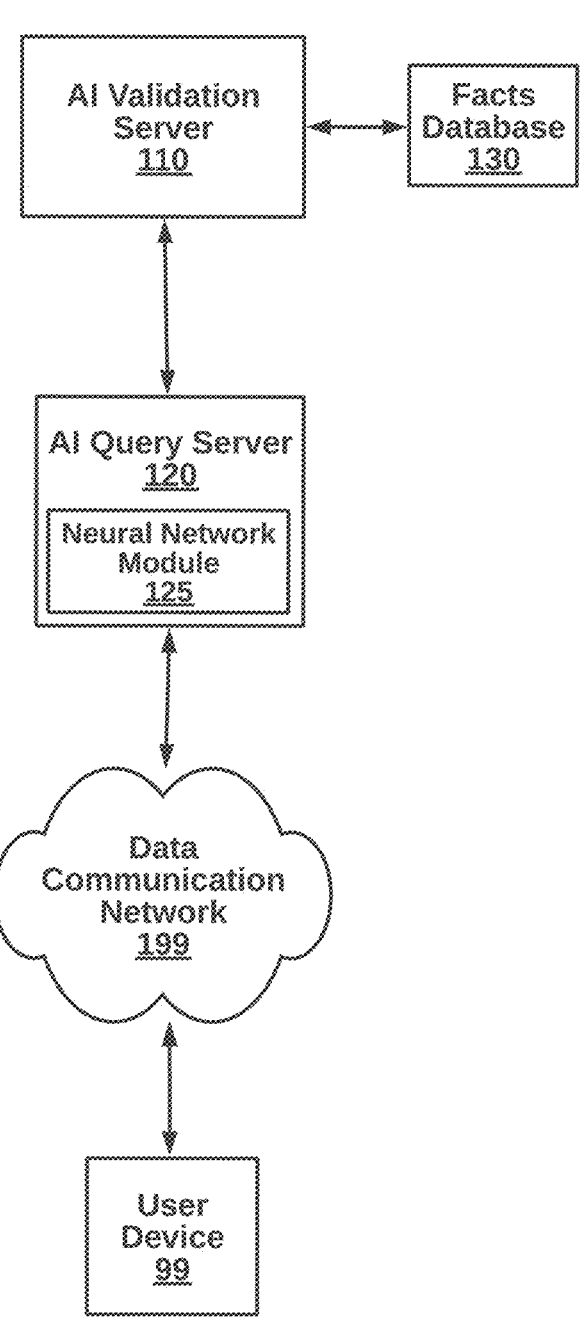
FIG. 1 is a high-level illustration of a system for real-time identification of fact hallucinations in query results produced by AI, according to an embodiment.

FIG. 1 is a high-level illustration of a system 100 for real-time identification of fact hallucinations in query results produced by AI, according to an embodiment. The system 100 includes an AI validation server 110, and an AI query server 120 and a fact database 130, each communicatively coupled to a data communication network 199. Many other embodiments are possible, for example, more or fewer access points, more or fewer stations, and additional components, such as firewalls, routers and switches. The system 100 components can be located locally on a LAN or include remote cloud-based devices, and can be implemented in hardware, software, or a combination similar to the example of FIG. 7.

The components of the system 100 are coupled in communication over a data communication network 199. Preferably, AI validation server 110, AI query server 120 and fact database 130 are connected to the data communication system 199 via hard wire. Other components, such as Wi-Fi stations and IoT devices can be connected indirectly via wireless connection. The Internet 199 can be any data communication network such as a WAN, a LAN, WLAN, a cellular network (e.g., 3G, 4G, 5G or 6G), or a hybrid of different types of networks. Various data protocols can dictate format for the data packets.

The AI validation server 110 determines when AI query responses potentially include fact hallucinations. As a result, inaccurate data is avoided and fact database 130 can correct itself. In one example, a user queries AI server 120 about living, pink colored groundhogs. One data set in fact database 130 can be indicative of live groundhog colors, without confirming or denying the existence of pink groundhogs. Another data set in fact database 130 can be indicative of pink colored groundhog candy. Problematically, the AI query server 120 may respond to the query with a fact hallucination referring to pink groundhog candy. Instead, AI validation server 110 runs a check on the underlying facts to identify the inaccuracy. Based on implementation rules, a remediation action can occur when inaccuracies are discovered, such as responding to the query as "answer unknown", "insufficient data" or the like.

The AI query server 120 can be a search engine, a smartphone app, a voice assistant, or any appropriate interface for making AI queries and receiving a response. A third party can operate AI query server 120 as a subscription-based software-as-a-service over the Internet. Query processing can occur in a neural network module 125 trained from fact database 130 or other resources. The training uses deep learning to process raw data through interconnected nodes in a layered structure.

In operation, AI queries are submitted in real-time or in batch under various scenarios. For example, human users can submit queries to an online AI service to answer general questions. In another example, a search engine process may submit search results for generating an AI summary to display along with the returned search results. In yet another example, a robot device may be searching for actions to take responsive to current sensory input.

Fact database 130 can be one or more data resources of tokenized data, such as database or other repository. Raw text is tokenized, using various techniques, and indexed. In one embodiment, AI query server 120 generates an AI response by processing a search of tokens. Before releasing the result, AI validation server 120 calculates a veracity score by searching fact database 130 for tokens related to the AI response for comparison. In other implementations, the veracity score is derived from comparison of the AI response from fact database 130 and fact checking from a different, second fact database.

FIG. 2 is a more detailed illustration of AI validation server 110 of the system 100 of FIG. 1. The AI validation server 110 includes an API module 210, a sentence retrieval module 220, a sentence scoring module 230, an AI performance module 240 and a veracity policy module 250. The modules can be implemented in source code stored in non-transitory memory executed by a processor. Alternatively, the modules can be implemented in hardware with microcode. The modules can be singular or representative of functionality spread over multiple components. Many other variations are possible.

The API module 210 establishes communication protocols between AI query server 120 and validation processes. For example, a query service can be configured over a user interface or using command line interface (CLI) commands. In real-time operation, an API call can be received along with an utterance for validation. An API response can be transmitted including validation results.

The sentence retrieval module 220 locates candidate compression blocks in facts database 130 with similar words to those used in the utterances. Next, candidate sentences are located within compression blocks stored in the verification repository by scanning for sentences inside blocks. Some sentences may have all the large words while others have less. One optimization for processing a large number of candidate sentences is parallel scanning, using appropriate hardware. As a result, the candidate sentences have elementary word-level similarity to the original sentence. These sentences can have a superficial similarity to the original query response being validated. Although similar, there may be additional words like "not" that radically change the meaning of a sentence.

The sentence scoring module 230 compares candidate sentences with the original sentence, or query response, for evidence that sentences known to be correct supports or does not support the utterance. In one embodiment, a veracity score is produced from a number of comparisons. In one embodiment, a sentence scoring threshold is set as a standard for fact verification. The threshold can be static for all cases, or dynamically based upon context.

The AI performance module 240 optionally tracks AI agent performance over time. From this, training can be refined, analytics produced and visualizations created.

The veracity policy module 250 sets rules for handling scoring outcomes. For example, the utterance can be prevented from being transmitted to a user when below a predetermined threshold. Other rules can transmit the utterance with a veracity score or color-coded confidence level (e.g., green background for high confidence, yellow background for medium confidence and red background for low confidence).

II. Methods for Identifying Fact Hallucinations (FIGS. 3-6)

Figure 3:
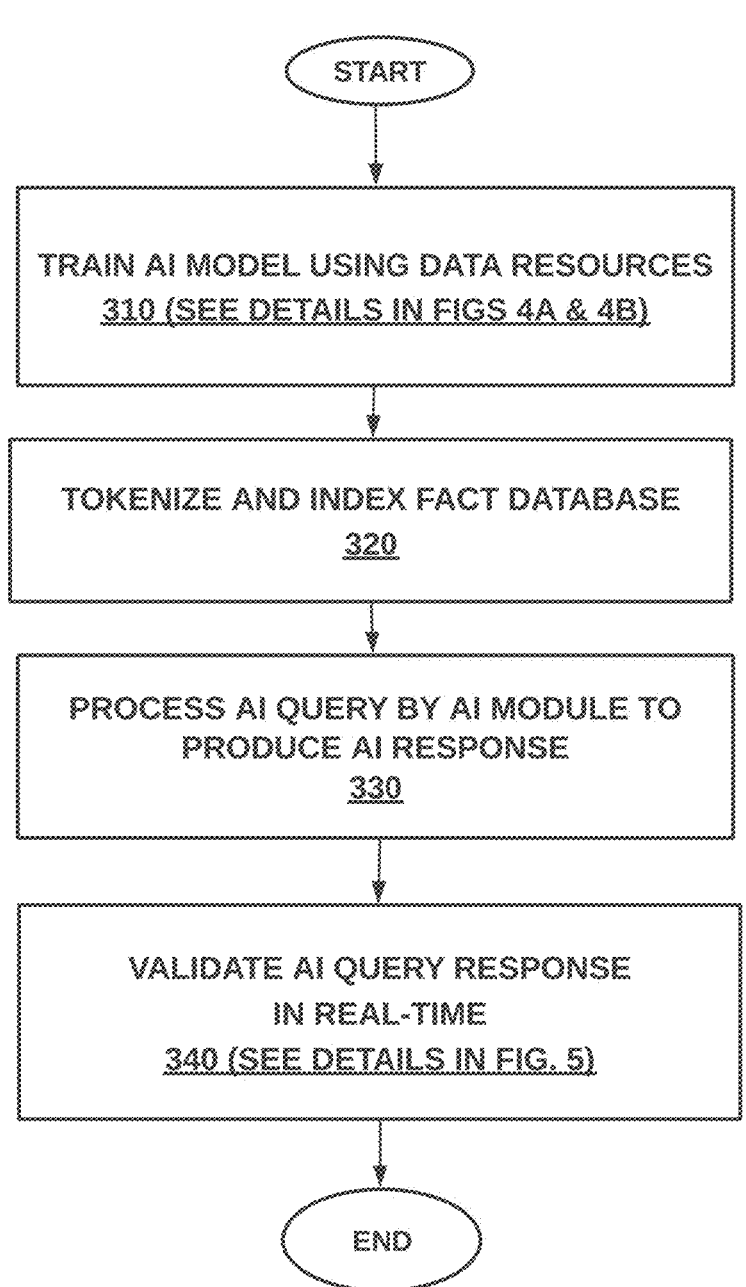
FIG. 3 is a high-level flow diagram illustrating a method for quality control for AI systems, according to an embodiment.
Figures 4A, 4B:
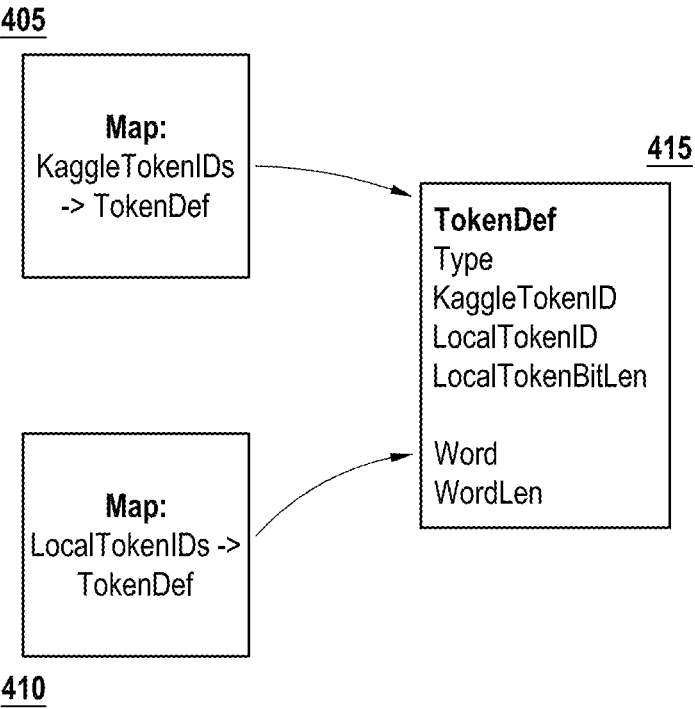
FIGS. 4A-4D are sequence diagrams illustrating tokenizing of a database, according to an embodiment.
Figure 4C:
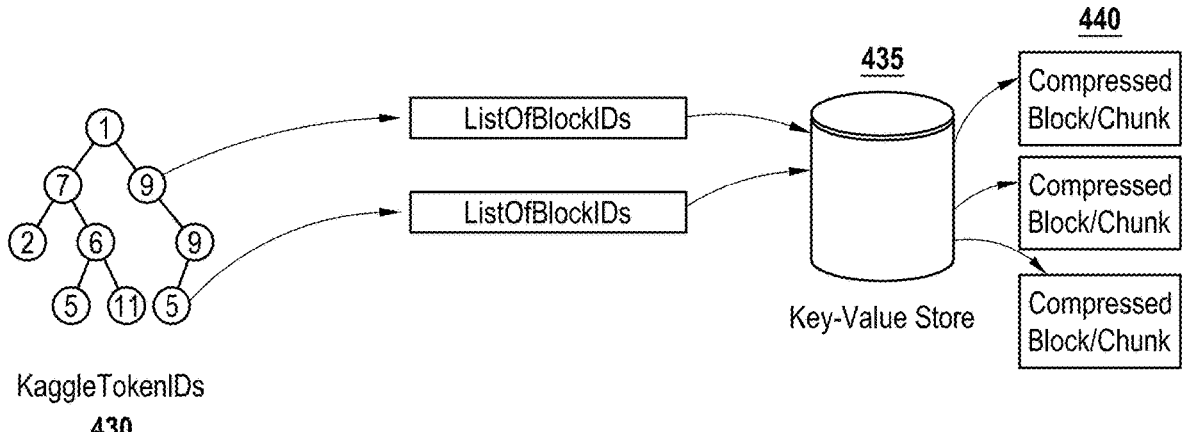
Figure 4D:
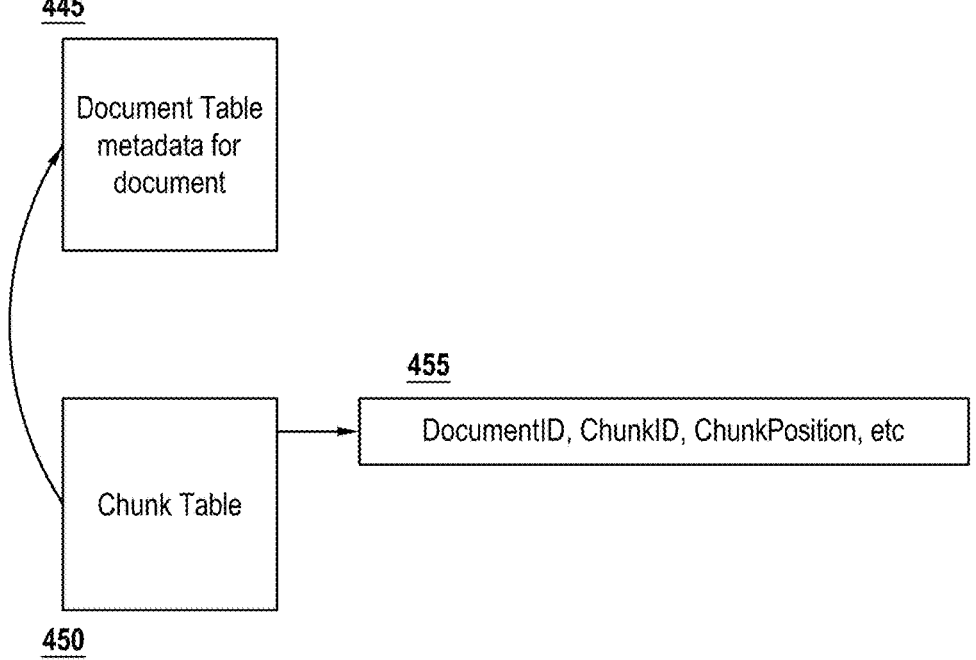

FIG. 3 is a high-level flow diagram illustrating a method for quality control for AI systems, according to one preferred embodiment. The method 300 can be implemented, for example, by the system 100 of FIG. 1. The steps are merely representative groupings of functionality, as there can be more or fewer steps, and the steps can be performed in different orders. Many other variations of the method 300 are possible.

At step 310, an AI model is trained using data resources. At step 320, a fact database is tokenized and indexed. At step 330 an AI query is processed by an AI module using, for instance, a neural model as an input is received in real-time. At step 340, a real-time AI query response is validated, as described more fully below with respect to FIG. 5. The query response involves at least two facts.

Further details to indexing the fact database are shown in FIGS. 4A-4D.

Word tokenization in conventional compression is the process of replacing words in an input stream with tokens, which can be reused when the word is next seen. The size of the output stream is thus reduced, with the token acting as a "stand in" for the original word. Given that words typically appear multiple times in documents, and providing tokens of appropriate bit-length length are selected, this can result in the output stream being considerably smaller (for the purpose of transmission or storage) than the original input stream.

Similarly, Byte-Pair encoding (BPE) can be used to encode the most frequent byte pairs in a text for alternate or additional size savings. The BPE technique is considered useful in ML for languages which combine smaller linguistic units together into words. Word-based tokenization is more suitable to western style languages, such as English. It is also used in conventional compression.

Once tokenized, ML techniques can then additionally discover relationships between the occurrences of tokens and encode this information in the neural network, using a variety of approaches. A slightly different, and more traditional, domain—conventional or information compression—specifically, in our topic of interest, across textual information. Using this technique, file sizes typically shrink by significant factors.

Being block-based, each "block" output from the compressor contains a separate "index" of token information for the block. Using this block, and a stream of tokens, a decompressor can reconstruct the original text from the compressed data. One advantage to this block-based approach is that compression of the individual blocks can essentially happen independently, and in parallel. Each block is essentially a self-contained compressed part of the original input.

Tokens bit lengths and actual values are computed based on "frequency of use" calculations; tokens with high usage frequencies (such as, for example, the word "the" in many English language texts) are replaced with very short tokens with bit-lengths as low as 2 bits. Less frequently used words (such as "fabulous") are replaced with longer token lengths.

The actual words for the tokens can be written in the block header or "index", along with the assigned token. Using a memorized version of this index, when the decompressor reads bits from the compressed block, it can use the index to figure out what word to replace the token with in the output stream. Without intending loss of generality, and for an abundance of clarity, we describe only the process for English word tokens, noting that the byte-pair process is almost identical, and a variant of this approach, and this application should be obvious to a reader skilled in the art.

In one version of the Kaggle dataset, each word is represented by a 3 byte tokenID, which provides for a total of 16,777,216 possible tokens, of which we are currently using 333,333 for "Kaggle words", "global token IDs" or "KaggleTokenIDs". This leaves 16,442,882 "unused" tokens (a variant of this scheme would be to use 16-bits worth of tokens—65 k tokens, but this space does not contain all the Kaggle words).

It should be obvious that the token set can be expanded to cover all words in the English language. The OED (Oxford English Dictionary) covers around 600,000 words, well within the 3-byte range. However, the Kaggle words can be used here as a stand-in for this larger set.

A single file, read at initialization time, contains the 333,333 Kaggle words, separated by spaces, in frequency of use order, with the most frequently used word first in the file. This file is ingested by the compressor at startup time.

Note that the Kaggle file contains the vast majority, but not all, of the words which the block compressor might encounter when compressing a block, and that typically, any given block will contain both a subset of the Kaggle words, and also some other "words" which do not exist in Kaggle, for example, mis-spellings, punctuation marks, words in quotes, or simply words not in Kaggle, etc.

Also note that, since the compressor is typically kept as a "hot" service for this application, the overhead of reading the initialization data is paid just once at startup time and is generally not significant.

Figure 5:
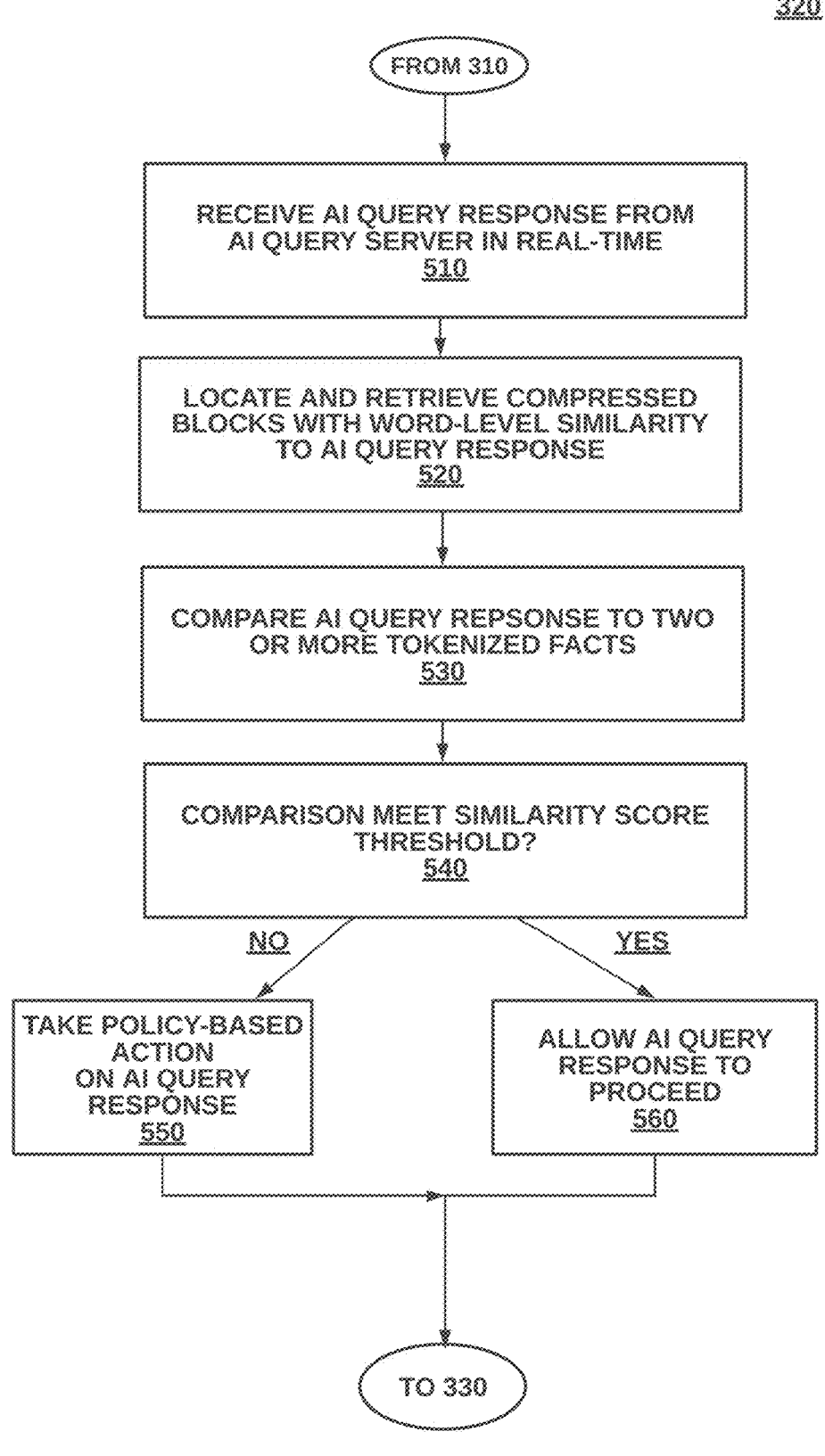
FIG. 5 is a more detailed flow diagram illustrating the step of real-time identification of fact hallucinations in query results produced by AI, for the method of FIG. 3, according to one embodiment.

FIG. 5 is a more detailed flow diagram illustrating the step 340 for real-time identification of fact hallucinations in query results produced by AI, according to one embodiment.

At step 510, an AI query response is received in real-time.

Figure 6:
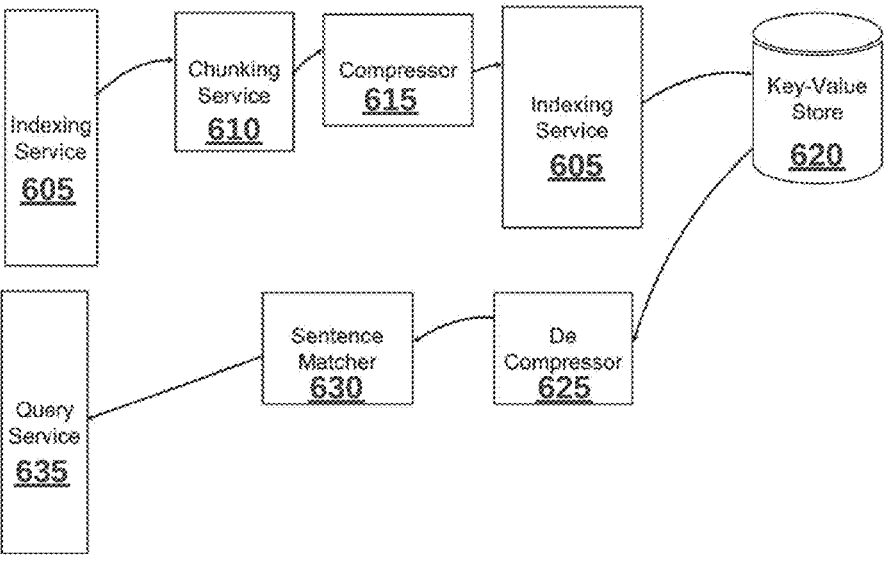
FIG. 6 is a sequence diagram illustrating generation of sentences for comparison, according to an embodiment.

At step 520, compressed blocks having word-level similarity to the query response are located and retrieved from a tokenized database, by tokenizing data of the AI query response. In more detail, as shown in FIG. 6, an indexing service 605 divides raw data into blocks with a chunking service 610 before being compressed 615 and indexed in a key-value store 620. These chunks are quickly located by the key-value and decompressed 625 to words when used by for word-level, sentence matching 630 against AI query results 635.

Referring again to FIG. 5, at step 530, the query response is compared to two or more tokenized facts of the compressed blocks at a data level. Comparing includes computing a similarity score of a vector derived from the tokenized query response to one or more vectors derived from the one or more tokenized facts.

At step 540, an action is taken based on the validation step. More specifically, responsive to a verification result failing to meet a similarity score threshold, a policy-based action is taken on the query response, at step 550, and responsive to the verification result meeting the similarity threshold, the AI query response is allowed to proceed, at step 560.

III. Generic Computing Device (FIG. 7)

Figure 7:
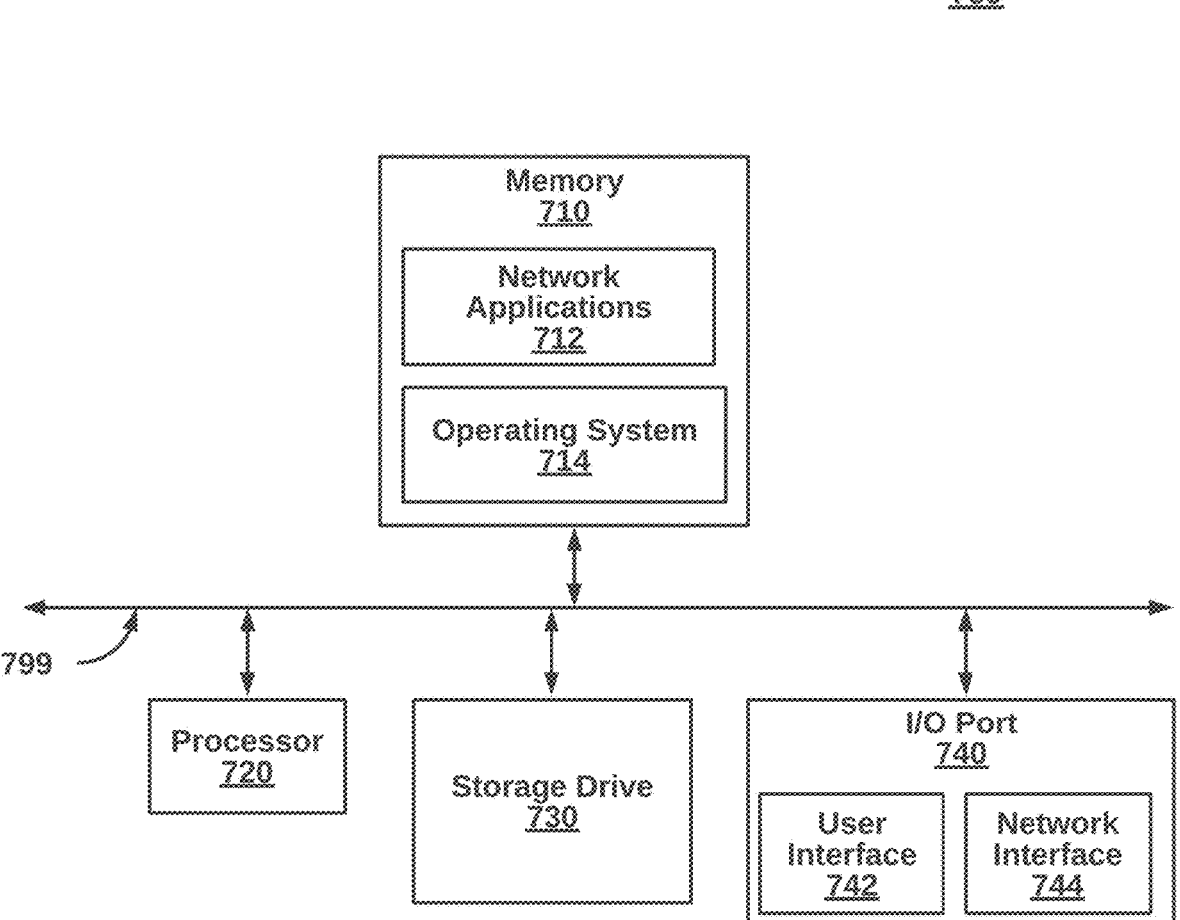
FIG. 7 is an example of a computing environment for implementing components of the system of FIG. 1, according to an embodiment.

FIG. 7 is a block diagram illustrating an example computing device 700 for use in the system 100 of FIG. 1, according to one embodiment. The computing device 700 is implementable for each of the components of the system 100. The computing device 700 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 700, of the present embodiment, includes a memory 710, a processor 720, a storage drive 730, and an I/O port 740. Each of the components is coupled for electronic communication via a bus 799. Communication can be digital and/or analog and use any suitable protocol.

The memory 710 further comprises network applications 712 and an operating system 714. The network applications 712 can include a web browser, a mobile application, an application that uses networking, a remote application executing locally, a network protocol application, a network management application, a network routing application, or the like.

The operating system 714 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6, Windows 8 or Windows 10), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 720 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 720 can be single core, multiple core, or include more than one processing elements. The processor 720 can be disposed on silicon or any other suitable material. The processor 720 can receive and execute instructions and data stored in the memory 710 or the storage drive 730.

The storage drive 730 can be any non-volatile type of storage such as a magnetic disc, EEPROM (electronically erasable programmable read-only memory), Flash, or the like. The storage drive 730 stores code and data for applications.

The I/O port 740 further comprises a user interface 742 and a network interface 744. The user interface 742 can output to a display device and receive input from, for example, a keyboard. The network interface 744 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with AI.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A method in an artificial intelligence (AI) validation server, for real-time identification of fact hallucinations in query results produced by AI, the method comprising:

receiving, in real-time, an AI query response processed by an AI module using a neural model as an input, wherein the AI query response involves at least two facts;

performing real-time verification of the query response by locating and retrieving compressed blocks from a token database having word-level similarity to the AI query response, wherein word-level similarity is computed from a weighted sum of Euclidian vector distances, by tokenizing data of the AI query response, wherein tokenizing comprises retrieving Kaggle tokenIDs associated with one or more words of the query response;

comparing the AI query response to one or more tokenized facts of the compressed blocks at a data level, wherein comparing includes computing a similarity score of a vector derived from the tokenized query response to one or more vectors derived from the one or more tokenized facts;

responsive to a verification result failing to meet a similarity score threshold, determining that a hallucination exists in the AI and taking a policy-based action on the AI query response; and responsive to the verification result meeting the similarity threshold, allowing the AI query response to proceed.

2. The method of claim 1, wherein the tokenizing one or more facts comprises Kaggle tokenIDs associated with one or more words of the one or more facts.

3. The method of claim 1, wherein comparing comprises performing an AND operation on the tokenized query response and the one or more tokenized facts.

4. The method of claim 1, wherein the policy-based action comprises blocking the query response.

5. The method of claim 1, wherein the policy-based action comprises logging the verification result.

6. The method of claim 1, further comprising: logging the fact hallucination.

7. The method of claim 1, further comprising: tracking performance of the AI module.

8. The method of claim 1, wherein the AI module producing the AI query response is located remotely from the AI validation server.

9. The method of claim 1, wherein a plurality of AI query responses are received from a plurality of different AI modules.

10. The method of claim 1, wherein the AI validation server and the AI module are both communicatively coupled to a data communication network.

11. The method of claim 1, wherein the AI validation server and the AI module are embedded in a common physical device.

12. The method of claim 1, further comprising:

receiving an AI query from a user over a data communication network, and allowing the AI query response to be transmitted to the user after successful validation.

13. A non-transitory computer-readable media in an artificial intelligence (AI) validation server, implemented at least partially in hardware, when executed by a processor, for real-time identification of fact hallucinations in query results produced by AI, the method comprising the steps of:

receiving, in real-time, an AI query response processed by an AI module using a neural model as an input, wherein the AI query response involves at least two facts;

performing real-time verification of the AI query response by locating and retrieving compressed blocks from a token database having word-level similarity to the AI query response, by tokenizing data of the AI query response, wherein word-level similarity is computed from a weighted sum of Euclidian vector distances, by tokenizing data of the AI query response, wherein tokenizing comprises retrieving Kaggle tokenIDs associated with one or more words of the query response;

comparing the AI query response to one or more tokenized facts of the compressed blocks at a data level, wherein comparing includes computing a similarity score of a vector derived from the tokenized query response to one or more vectors derived from the one or more tokenized facts;

responsive to a verification result failing to meet a similarity score threshold, determining that a hallucination exists in the AI query response and taking a policy-based action on the AI query response; and responsive to the verification result meeting the similarity threshold, allowing the AI query response to proceed.

14. An artificial intelligence (AI) validation server, for real-time identification of hallucinations in query results produced by AI, the AI validation server:

a processor;

a network gateway communicatively coupled to the processor and to the data communication network; and a memory communicatively coupled to the processor and storing modules, comprising:

an API module configured to receive, in real-time, a query response processed by an AI module using a neural model as an input, wherein the AI query response involves at least two facts;

a sentence retrieval module configured to perform real-time verification of the AI query response by locating and retrieving compressed blocks from a token database having word-level similarity to the AI query response, by tokenizing data of the AI query response, wherein word-level similarity is computed from a weighted sum of Euclidian vector distances, by tokenizing data of the AI query response, wherein tokenizing comprises retrieving Kaggle tokenIDs associated with one or more words of the query response;

a sentence score module configured to compare the AI query response to one or more tokenized facts of the compressed blocks at a data level, wherein comparing includes computing a similarity score of a vector derived from the tokenized query response to one or more vectors derived from the one or more tokenized facts, wherein the sentence scoring module is configured to, responsive to a verification result failing to meet a similarity score threshold, determine that a hallucination exists in the AI query response; and a veracity policy module configured to, responsive to the verification result failing, take a policy-based action on the AI query response, wherein responsive to the verification result meeting the similarity threshold, allow the AI query response to proceed.

* * * * *